(12) United States Patent
Brown et al.

(10) Patent No.: US 7,719,828 B2
(45) Date of Patent: May 18, 2010

(54) RUGGED HARD DISK DRIVE STORAGE ASSEMBLY

(75) Inventors: Jonathan M. Brown, Endicott, NY (US); Gary Deaton, Vestal, NY (US); Ryan S. Riegle, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 461 days.

(21) Appl. No.: 11/491,296

(22) Filed: Jul. 22, 2006

(65) Prior Publication Data

US 2007/0058335 A1    Mar. 15, 2007

Related U.S. Application Data

(60) Provisional application No. 60/716,997, filed on Sep. 14, 2005.

(51) Int. Cl.
*H05K 5/00* (2006.01)
*H05K 7/00* (2006.01)

(52) U.S. Cl. ............... 361/679.34; 361/679.31; 361/679.33; 361/679.35; 361/679.36; 361/679.37; 361/679.38; 361/679.39

(58) Field of Classification Search ............... 361/685, 361/683, 679.31, 679.33, 679.34, 679.35, 361/679.36, 679.37, 679.38, 679.39
See application file for complete search history.

(56) References Cited

U.S. PATENT DOCUMENTS

| | | | |
|---|---|---|---|
| 4,642,715 A | 2/1987 | Ende | |
| 5,149,048 A | 9/1992 | Morehouse et al. | |
| 6,320,744 B1 * | 11/2001 | Sullivan et al. | ............. 361/685 |
| 6,490,123 B1 | 12/2002 | Okunaga et al. | |
| 6,535,381 B2 * | 3/2003 | Jahne et al. | ............. 361/685 |
| 6,804,111 B1 * | 10/2004 | Williams et al. | ............. 361/685 |
| 6,967,833 B2 * | 11/2005 | Boykin et al. | ............. 361/685 |
| 7,113,398 B2 * | 9/2006 | Oba et al. | ............. 361/685 |
| 2002/0154441 A1 | 10/2002 | Tadepalli | |
| 2004/0114473 A1 | 6/2004 | Fan et al. | |
| 2004/0190193 A1 | 9/2004 | Kuwajima et al. | |
| 2005/0057849 A1 | 3/2005 | Twogood et al. | |
| 2005/0068666 A1 | 3/2005 | Albrecht et al. | |
| 2006/0072241 A1 * | 4/2006 | Feliss et al. | ............. 360/97.02 |

* cited by examiner

*Primary Examiner*—Jayprakash N Gandhi
*Assistant Examiner*—Anthony M Haughton
(74) *Attorney, Agent, or Firm*—Dillon & Yudell LLP

(57) ABSTRACT

A rugged hard disk drive storage assembly is disclosed. The rugged hard disk drive storage assembly includes an enclosure capable of containing multiple hard disk drives. The enclosure also contains multiple shock and vibration absorbers that are configured to elastically support all the hard disk drives contained within the enclosure. The multiple shock absorbers protect the delicate electronic hard disk drives and their sensitive information from shock and vibration damage, even when the enclosure has been removed from the drive container, and is being carried away by personal in a harsh combat environment. In addition, the enclosure is hermetically sealed such that the hard disk drives are isolated from external environment.

4 Claims, 3 Drawing Sheets

RUGGED HARD DISK DRIVE STORAGE ASSEMBLY

RELATED PATENT APPLICATION

The present patent application claims priority to copending provisional application U.S. Ser. No. 60/716,997, filed on Sep. 14, 2005.

BACKGROUND OF THE INVENTION

1. Technical Field

The present invention relates to disk storage assemblies in general, and in particular to portable disk storage assemblies. Still more particularly, the present invention relates to a portable hard disk drive storage assembly that is rugged, shock-proof and contained within a hermetically sealed enclosure.

2. Description of Related Art

Hard disk drives are one of the more prevailing direct access storage devices for data processing systems. A hard disk drive typically has a rotatable disk medium and a magnetic head. The magnetic head includes a read head for reading data from and writing data to the rotatable disk medium. The magnetic head is coupled to an actuator mechanism to be moved and positioned by a voice coil motor. The actuator mechanism moves and positions the magnetic head to a predetermined track to perform reading and writing operations.

Because of the mechanical construction of the rotatable disk medium and the actuator mechanism, hard disk drives tend to be very vulnerable to shocks, vibration, altitude, and foreign contaminants that can damage the internal components of the hard disk drives. As such, hard disk drives are generally not intended to be carried around. In order to have a portable hard disk drive that is also reliable, additional measures must be taken to protect the hard disk drive from environments that would potentially damage the device.

The present disclosure provides a portable hard disk drive storage assembly that is rugged and shockproof.

SUMMARY OF THE INVENTION

In accordance with a preferred embodiment of the present invention, a portable hard disk drive storage assembly includes an enclosure capable of containing multiple hard disk drives. The enclosure also contains multiple shock mount isolators that are configured to elastically support all the hard disk drives contained within the enclosure. In addition, the enclosure is hermetically sealed such that the hard disk drives are isolated from external environment.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
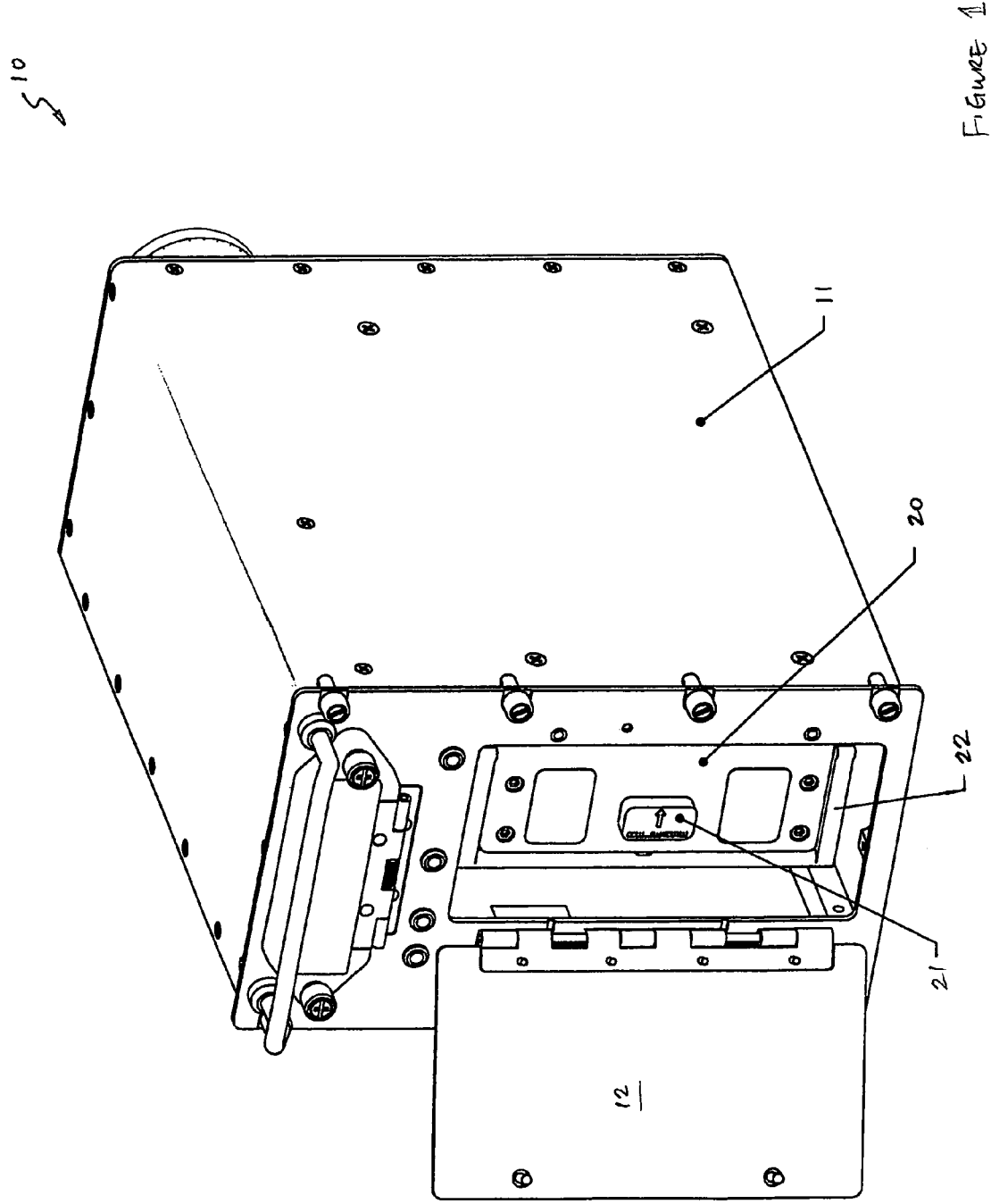
FIG. 1 is a perspective view of a device container in which a portable hard disk drive assembly can be mounted, in accordance with a preferred embodiment of the present invention.

Referring now to the drawings and in particular to FIG. 1, there is illustrated a perspective view of a device container in which a portable hard disk drive assembly can be mounted, in accordance with a preferred embodiment of the present invention. As shown, a device container 10 includes a metal chassis 11 having an access door 12. Metal chassis 11 has multiple mounting points for enabling metal chassis 11 to be securely mounted inside an aircraft or a vehicle.

In FIG. 1, with access door 12 being opened, metal chassis 11 is shown to contain a portable hard disk drive assembly 20. Portable hard disk drive assembly 20 can be inserted into metal chassis 11 via a locking insertion and extraction handle 22. Locking insertion and extraction handle 22 is shown in its folded position. Locking insertion and extraction handle 22 can be unfolded via the pressing of a handle release button 21. At such point, portable hard disk drive assembly 20 can be quickly and easily released from metal chassis 11 by the pulling of locking insertion and extraction handle 22.

The quick release of portable hard disk drive assembly 20 from metal chassis 11 is very important in an evacuation during combat, especially when important information are being stored in portable hard disk drive assembly 20. With the quick release and portable nature of portable hard disk drive assembly 20, portable hard disk drive assembly 20 can be detached and carried away during an evacuation in order to ensure that important information stored in portable hard disk drive assembly 20 will not be fallen into enemy's hands.

Figure 2:
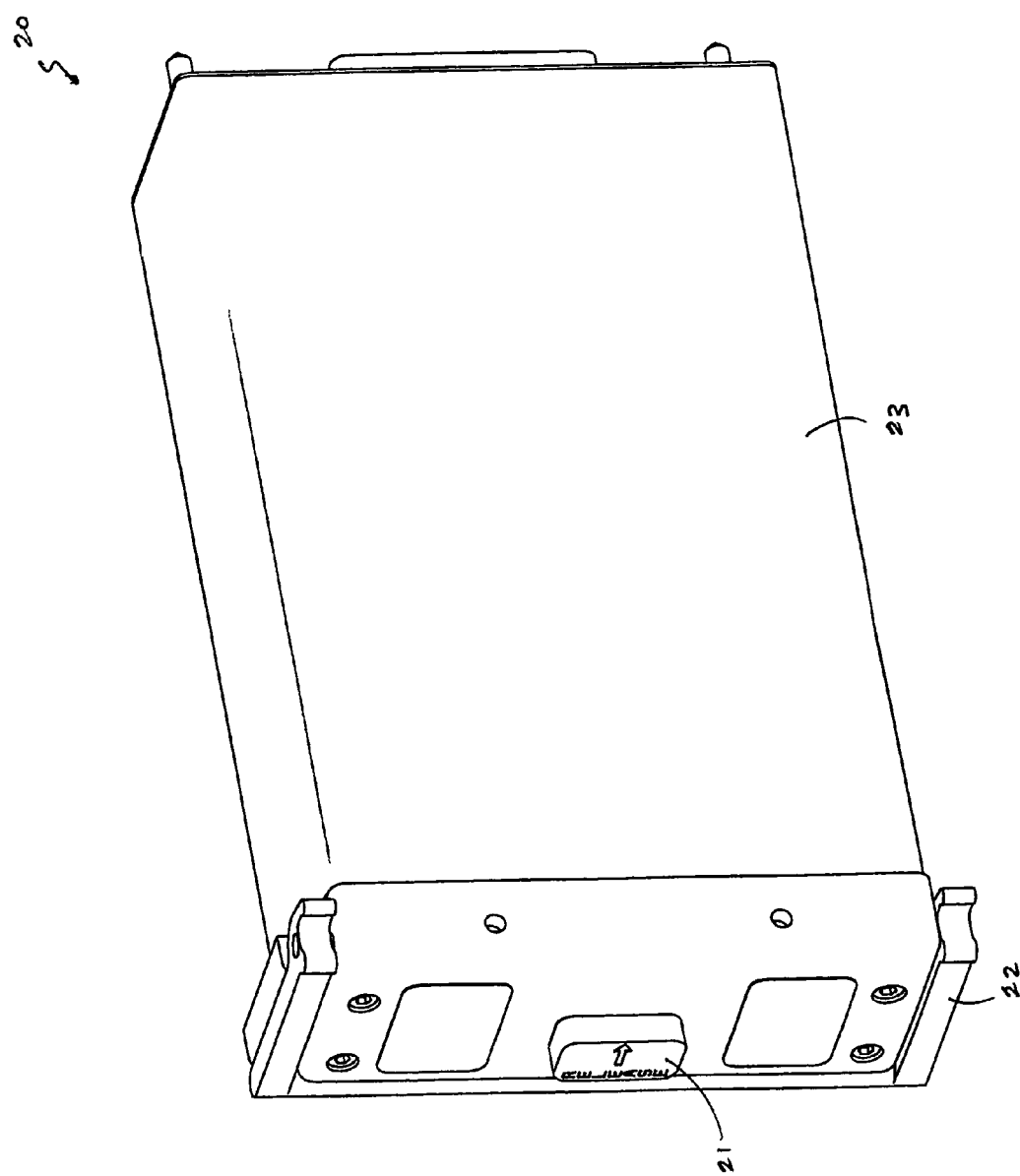
FIG. 2 is a perspective view of a portable hard disk drive assembly, in accordance with a preferred embodiment of the present invention.

With reference now to FIG. 2, there is depicted a perspective view of portable hard disk drive assembly 20, in accordance with a preferred embodiment of the present invention. In addition to handle release button 21 and handle 22, portable hard disk drive assembly 20 includes an enclosure 23 that is hermetically sealed. Before enclosure 23 is hermetically sealed, the air within enclosure 23 is completely removed and preferably replaced with dry nitrogen. Enclosure 23 may contain multiple hard disk drives. For the present embodiment, enclosure 23 preferably includes four 2.5 inch hard disk drives.

Figure 3:
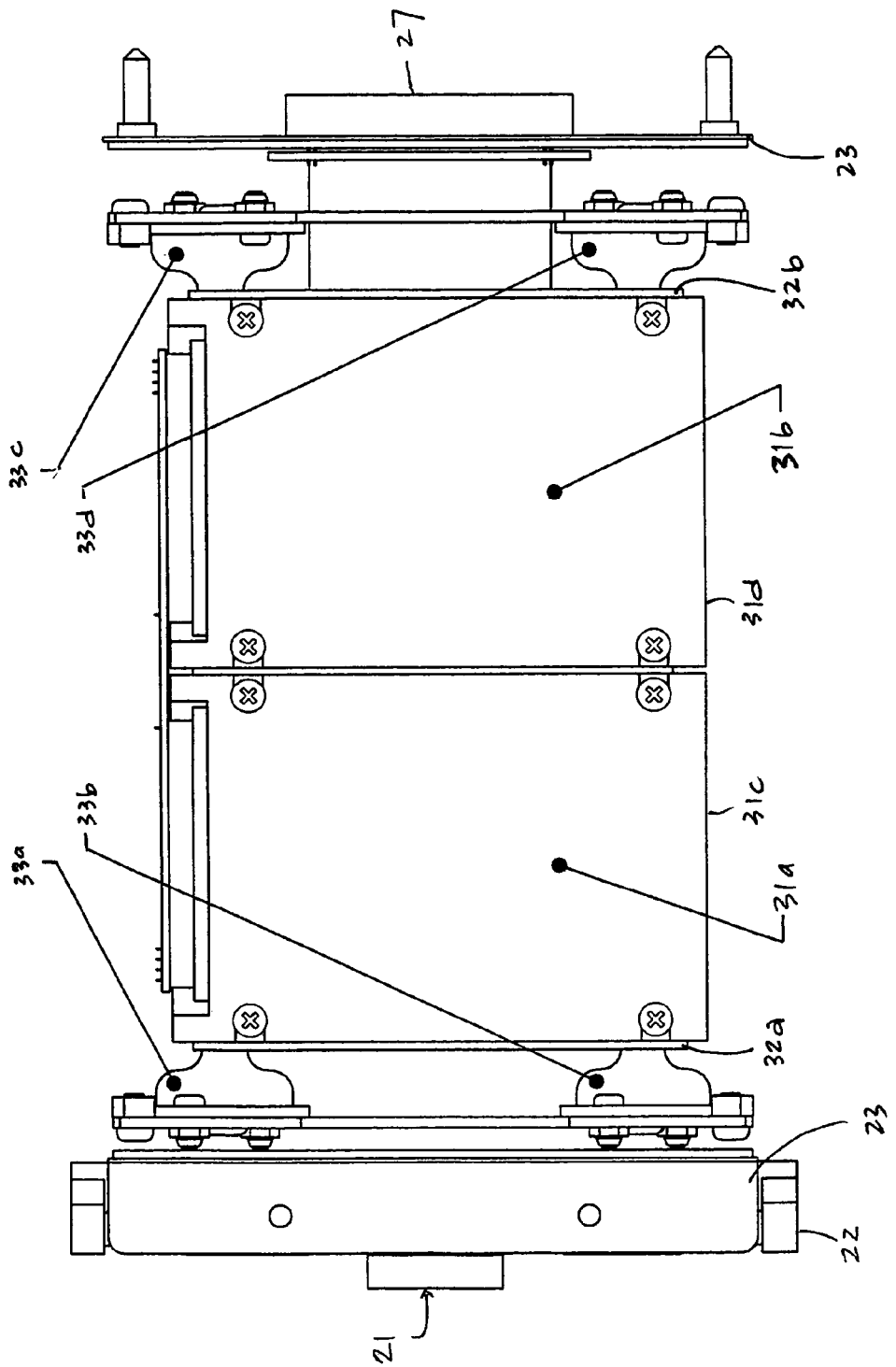
FIG. 3 is a top view of the inside of the portable hard disk drive assembly from FIG. 2, in accordance with a preferred embodiment of the present invention.

Referring now to FIG. 3, there is illustrated a top view of the inside of portable hard disk drive assembly 20, in accordance with a preferred embodiment of the present invention. As shown, enclosure 23 includes hard disk drives 31a and 31b stacked on top of hard disk drives 31c and 31d, respectively. Hard disk drives 31a-31d are securely mounted on plates 32a and 32b that are connected to enclosure 23 via shock mount isolators 33a-33d. Shock mount isolators 33a-33d are preferably made of elastic materials that can provide shock isolation and vibration isolation for hard disk drives 31a-31d. For example, shock mount isolators 33a-33d can be made of rubber or metal springs.

In addition, enclosure 23 includes a hermetic connector 27 for providing connection to a system computer (not shown) located within device container 10 (from FIG. 1). Preferably, hermetic connector 27 has two 104-pin D-subminiature connectors that meet military specification MIL-C-24308. Although not shown, enclosure 23 also includes multiple internal flex cables to provide power and input/output signals from hermetic connector 27 to hard disk drives 31a-31d As has been described, the present invention provides a portable hard disk drive storage assembly that is rugged and shockproof.

While the invention has been particularly shown and described with reference to a preferred embodiment, it will be understood by those skilled in the art that various changes in form and detail may be made therein without departing from the spirit and scope of the invention.

What is claimed is:

1. A portable hard disk drive storage assembly, comprising:
    an enclosure for containing a plurality of hard disk drives, wherein said enclosure is hermetically sealed;
    a plurality of shock mount isolators connected between an inside wall within said enclosure and, said plurality of hard disk drives contained within said enclosure in order to provide elastic support for said plurality of hard disk drives; and
    a device container for containing said enclosure, wherein said enclosure includes a handle and a handle release button to allow said enclosure to be released from said device container via the pressing of said handle release button following by the pulling of said handle wherein said pressing of said handle release button is in a direction towards an interior of the enclosure; wherein said handle is pivotally connected to two opposite ends of a front plate of said enclosure; and wherein said handle release button is not in direct contact with said handle.

2. The portable hard disk drive storage assembly of claim 1, wherein said enclosure is filled with dry nitrogen.

3. The portable hard disk drive storage assembly of claim 1, wherein said shock mount isolators are made of rubber.

4. The portable hard disk drive storage assembly of claim 1, wherein said shock mount isolators are metal springs.

* * * * *